United States Patent [19]
Ishikawa

[11] Patent Number: 5,959,293
[45] Date of Patent: Sep. 28, 1999

[54] DEFECTIVE PORTION DETECTING DEVICE WITH A HORIZONTAL SYNCHRONIZED SIGNAL

[75] Inventor: Fumio Ishikawa, Kanagawa, Japan

[73] Assignee: Sony Corporation, Tokyo, Japan

[21] Appl. No.: 08/980,260

[22] Filed: Nov. 28, 1997

[30] Foreign Application Priority Data

Nov. 28, 1996 [JP] Japan ..................................... 8-332988
Oct. 30, 1997 [JP] Japan ..................................... 9-299031

[51] Int. Cl.[6] ....................................................... H01J 5/16
[52] U.S. Cl. ............................... 250/227.14; 250/227.23; 385/12
[58] Field of Search ......................... 250/227.14, 227.15, 250/227.16, 227.23; 385/12, 13; 356/73.1; 359/110, 111, 177; 340/555

[56] References Cited

U.S. PATENT DOCUMENTS 5,592,577   1/1997   Tanoue ....................................... 385/12

*Primary Examiner*—Que T. Le
*Attorney, Agent, or Firm*—Jay H. Maioli

[57] ABSTRACT

A system to easily detect defective portions of a transmission line in a short time, wherein the optical signal which has been generated on the basis of the transmission pulse which is outputted in synchronization with the horizontal synchronized signal is transmitted via the transmission line, and the reflected-light component which has been reflected by the defective portion in the transmission line is received, and the gain of the reflected-light component is increased by one step for each predetermined number of a horizontal lines on the basis of the horizontal synchronized signal and then compared with the reference voltage, so that the binary data is obtained. The binary data is displayed, along with the axis of the abscissa which represents the distance of the transmission line corresponding to the time difference between the optical signal and the reflected-light component, and the axis of the ordinate which represents the signal level of the reflected-light component.

8 Claims, 12 Drawing Sheets

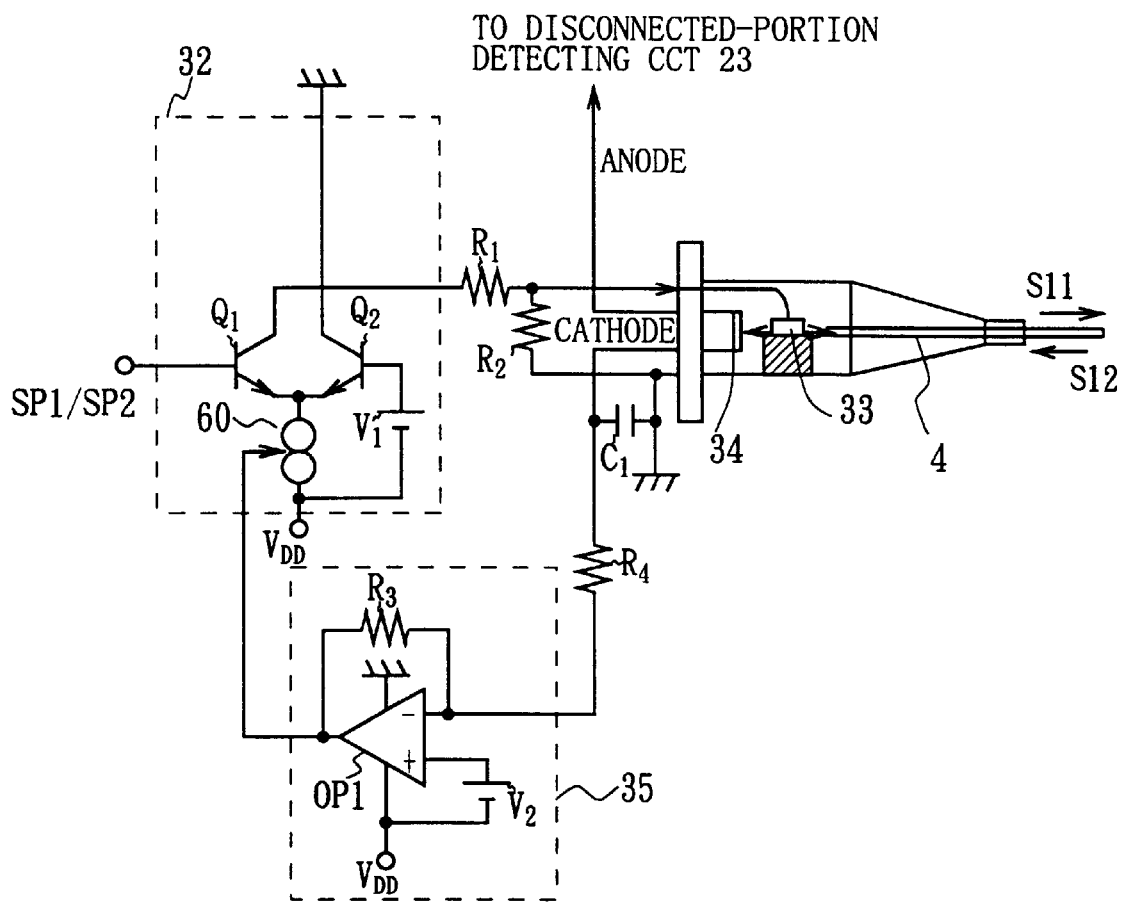
FIG. 5
FIG. 6A  LIGHT PULSE ($R_2$ DOES NOT EXIST)
FIG. 6B  LIGHT PULSE ($R_2$ EXISTS)
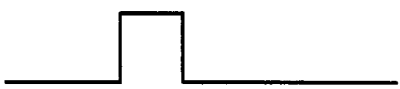
FIG. 6C  WAVEFORM OF IDEAL INPUT PULSE

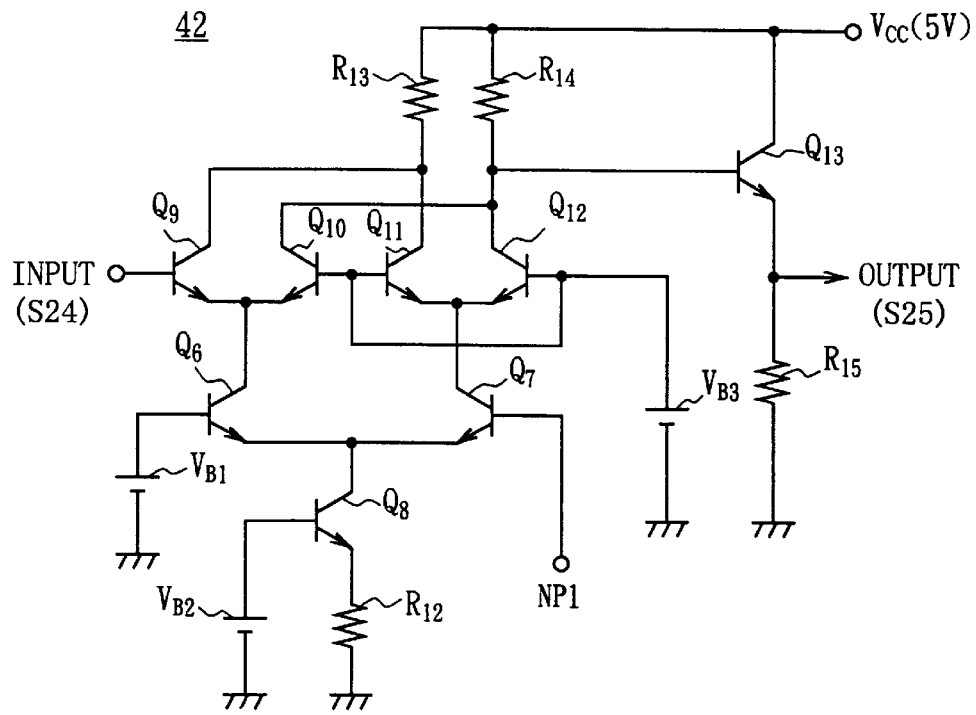
FIG. 9
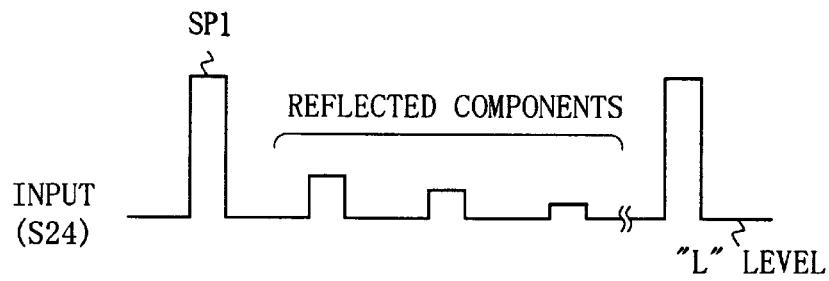
FIG. 10A  INPUT (S24)
FIG. 10B  EXTRACTING PULSE (NP1)
FIG. 10C  OUTPUT (S25)

DEFECTIVE PORTION DETECTING DEVICE WITH A HORIZONTAL SYNCHRONIZED SIGNAL

BACKGROUND OF THE INVENTION

1. Field of the Invention

This invention relates to a defective portion detecting device, and suitably applicable to, for instance, a defective portion detecting device for detecting a defective portion of an optical-fiber cable which is used for transmission of a signal.

2. Description of the Related Art

Heretofore, in the case where a recording of a program is performed using a video camera in a studio and such, a camera-CCU system is utilized which is formed by connecting a video camera and a camera control unit (CCU) for controlling the television camera by a cable. In fact, in a camera-CCU system, a video camera is located in the studio, while a CCU is located at a distant place from the studio, for instance, a sub-control room. By the way, with respect to a camera-CCU system, the video camera is often requested to be moved to a shooting field other than a studio and used, and the CCU is requested to be placed on such a location that signal processing such as editing and transmitting of the video signal which has been shot by the video camera can be performed easily and the electric power-source can be obtained easily and used.

In the case where a video camera is moved to a shooting field, etc. from such requests, in a camera-CCU system, cables are frequently coupled together using connectors and also frequently disconnected from connectors, in order to adjust the length of the cable which connects the video camera and the CCU.

Therefore, in a camera-CCU system, by using an optical fiber as a cable, signal transmission of broad band is performed such that a signal loss due to the cable is lowered, and also miniaturization is achieved since the cable itself is lightened and the sectional area of it is diminished. That is, in a camera-CCU system, by connecting the video camera and the CCU with an optical fiber cable, the cable can be easily moved, and the signal loss due to elongation of the length of the cable can be prevented.

By the way, in a camera-CCU system of such configuration, the length of the optical fiber cable for connecting the video camera with the CCU sometimes reaches to 2000[m]. Therefore, it is needed to detect whether or not the laser light which is transmitted through such length of optical fiber cable is being transmitted without a loss. In such a case, a special-purpose measuring apparatus such as an oscilloscope is usually utilized.

However, in fact, it is not easy and has poor practicality to detect a defective portion such as breaking of wire or unsatisfactory connection utilizing a special-purpose measuring apparatus such as an oscilloscope at a shooting field, etc.

Besides, in a camera-CCU system, many optical fiber cables are connected by connectors so as to connect the video camera with the CCU; so, to detect a breaking of a wire, an unsatisfactory connection, etc., it is required to ascertain the state of connection of the optical fiber cable at all connector portions; therefore, there has been such a problem that much time and much effort are needed.

SUMMARY OF THE INVENTION

In view of the foregoing, an object of this invention is to provide a defective portion detecting device which can easily detect a defective portion of a transmission line in a short time.

The foregoing object and other objects of the invention have been achieved by the provision of a defective portion detecting device. According to this invention, an optical signal which has been generated on the basis of a transmission pulse outputted in a synchronized manner with a horizontal synchronized signal is transmitted via a transmission line, a reflected light component which has been reflected by a defective portion in the transmission line is received, the gain of the reflected light component is raised one step per horizontal line on the basis of the horizontal synchronized signal and then it is compared with the reference voltage level to obtain a binary data, and the binary data is displayed along with an axis of abscissas which represents the distance of the transmission line corresponding to the time difference between the optical signal and the reflected light component and an axis of ordinates which represents the level of the reflected light component.

By this, it is able to display the level of the reflected light component at a position corresponding to the distance of the transmission line where the reflected light component has occurred in the form of an analog bar graph; and so it is able to judge whether the cause of the defective portion is a breaking of a wire, an unsatisfactory connection, or a sticking of foreign substance on the basis of the level of the reflected light component, and easily detect the portion which becomes a problem, in a short time.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 5 is a circuit diagram showing constitutions of the laser driver circuit and the automatic laser-power control circuit;

FIGS. 6A to 6C are schematic diagrams illustrating waveforms of the inputted pulse;

FIG. 9 is a circuit diagram showing a constitution of the transmitting pulse extracting circuit;

FIGS. 10A to 10C are wave-form diagrams showing the relationship between the input signal and the output signal;

DETAILED DESCRIPTION OF THE EMBODIMENT

Figure 1:
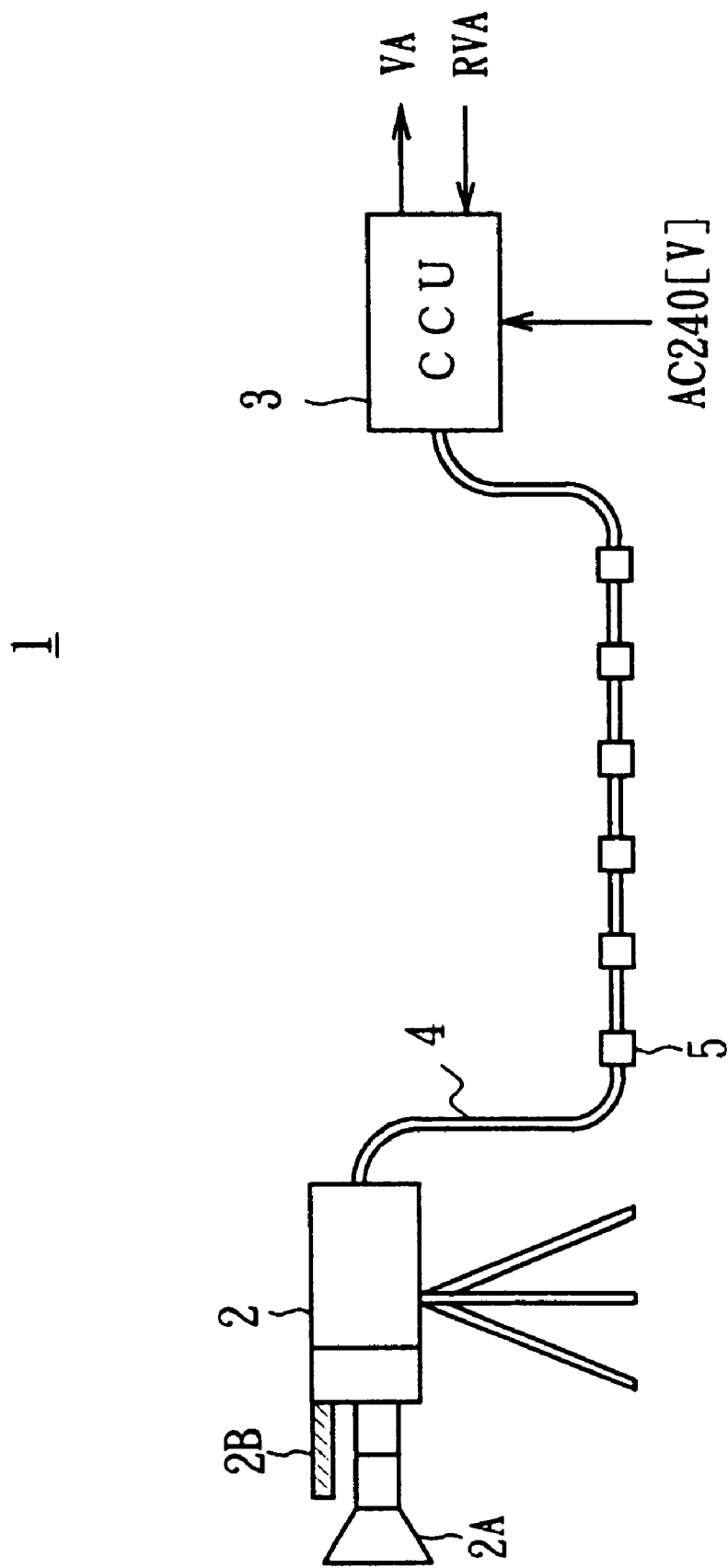
FIG. 1 is a schematic diagram illustrating the constitution of a camera-CCU system which is using a disconnected-portion detecting circuit according to an embodiment of the present invention.

Preferred embodiments of this invention will be described with reference to the accompanying drawings:

(1) General Configuration of a Camera-CCU System Using a Disconnected Portion Detecting Circuit according to the Embodiment The camera-CCU system using the disconnected portion detecting circuit according to the embodiment is generally designated as 1 in FIG. 1, and comprised of a video camera 2 which includes an image pick-up portion 2A for generating a video signal and a microphone 2B for generating an audio signal, a CCU 3 for controlling the video camera 2, and an optical fiber cable 4 for connecting the video camera 2 with the CCU 3.

The optical fiber cable 4, when viewed from the video camera 2, is a composite optical fiber cable wherein two optical fibers for transmission and reception and a metal cable for electric power-supply have been combined, and a plurality of cables are connected in series by connectors, shown typically at 5. In addition, the CCU 3 receives electric power-supply of AC 240[V] from the exterior, and supplies the power-supply to the video camera 2 via the metal cable of the optical fiber cable 4.

In fact, as to the camera-CCU system 1, in the case where the video camera 2 has been placed in the studio and the CCU 3 has been placed in the sub-control room as an example, the video camera 2 and the CCU 3 are connected by the optical fiber cable 4 which has been placed between the studio and the sub-control room. By this, the camera-CCU system 1 supplies the power-supply of AC 240[V] to the video camera 2 in the studio from the CCU 3 in the sub-control room via the metal cable, and also supplies various control signals (as described herein below).

Now, the camera-CCU system 1 performs shooting with the video camera 2 in the studio, and delivers the camera video and audio signal VA to the CCU 3 of the sub-control room via the optical fiber cable 4. The CCU 3 performs various signal processing with respect to the camera video and audio signal VA, and outputs a camera video and audio signal VA toward an editing unit or a switcher, etc. (not shown)

In this case, the CCU 3 receives a returned video and audio signal RVA from the editing unit as a signal representing the video information which is currently being sent on the air, and delivers it to the video camera 2. By this, when the returned video and audio signal RVA has been received by the video camera 2, the cameraman can recognize the video information which is currently being sent on the air. In practice, by turning a switch while shooting via a view finder (not shown), the cameraman can determine the camera picture to which he is shooting at present and recognize the image which is currently being sent on the air.

(2) Configuration of the Transmission Division of the Camera-CCU System

Figure 2:
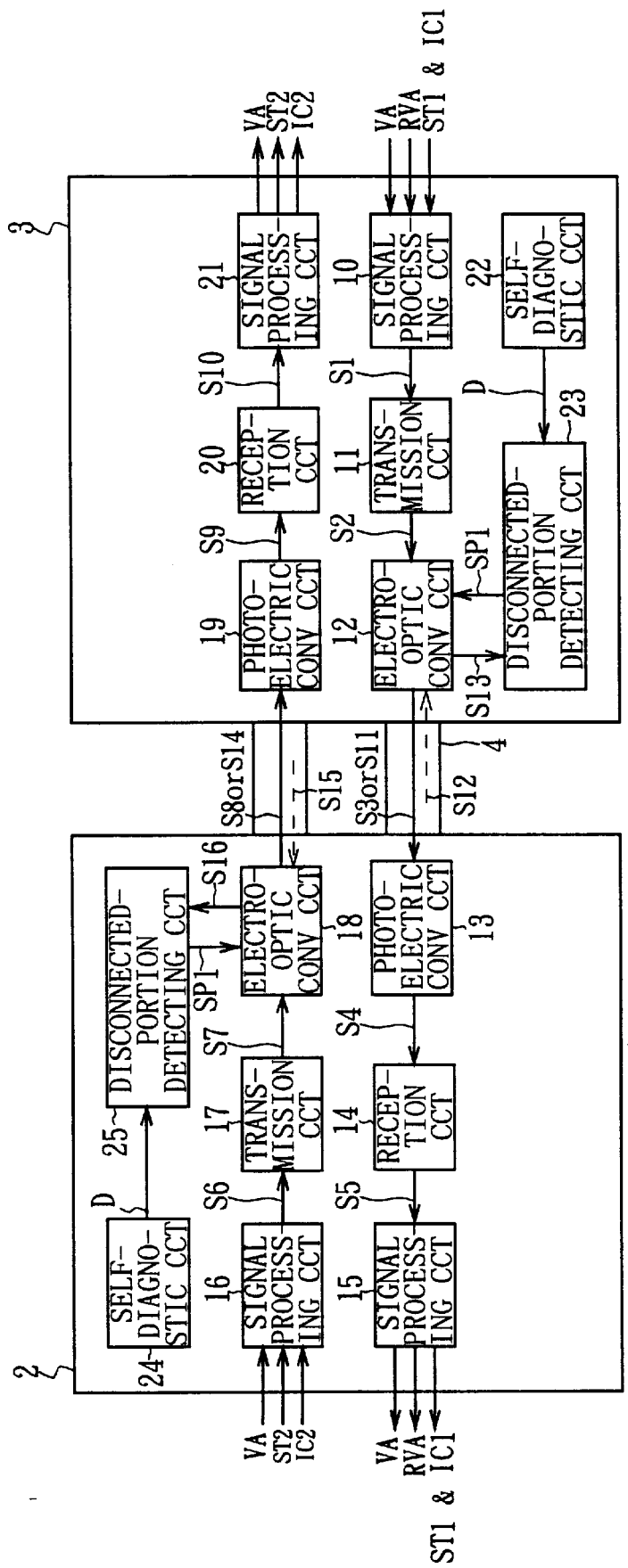
FIG. 2 is a block diagram showing a constitution of the transmitting division of the camera-CCU system.

Next, the transmission division of the video camera 2 and the CCU 3 is described referring to FIG. 2. As to the CCU 3, as shown in FIG. 2, a signal processing circuit 10 receives the camera video and audio signal VA, the returned video and audio signal RVA, a system information signal ST1, and an intercom signal IC1.

Here, the system information signal ST1 means the information related to the shooting action of the video camera 2 and the controlling of video signal processing, for instance, lens diaphragmming, selection of color filter, contour correction, gamma control of each channel, etc. While, the intercom signal IC1 is a communication signal such as sound between the studio (field) and the staff of the sub-control room.

In this case, a signal processing circuit 10 changes the phases of the camera video and audio signal VA, the returned video and audio signal RVA, the system information signal ST1, and the intercom signal IC1, and performs time-sharing and multiplexing processing, and then delivers to a transmission circuit 11 as a multiplexed signal S1. The transmission circuit 11 amplifies the multiplexed signal S1 to a level at which electro-optic conversion is possible, and delivers it to an electro-optic conversion circuit 12 as a main transmission signal S2.

The electro-optic conversion circuit 12, which has a semi-conductor laser such as a laser diode, converts the main transmission signal S2 into an optical signal S3 (laser light), and transmits it through the optical fiber cable 4, so as to deliver it to a photoelectric conversion circuit 13 of the video camera 2 side.

The photoelectric conversion circuit 13, which has a light receiving element such as a photo-diode, receives the optical signal S3 and converts it into an electric signal S4, and then delivers it to a reception circuit 14. The reception circuit 14 amplifies the electric signal S4 to a level at which signal processing can be performed at a signal processing circuit 15, and delivers it to the signal processing circuit 15 as a received signal S5. The signal processing circuit 10 performs divide processing of the received signal S5, and outputs the camera video and audio signal VA, the returned video and audio signal RVA, the system information signal ST1, and the intercom signal IC1, at the video camera 2 side.

By this, the CCU 3 performs controlling of the shooting action of the video camera 2 and the video signal processing on the basis of the system information signal ST1, and displays the communicating articles from the staff of the sub-control room and/or outputs the voice of the staff from a headphone or a speaker on the basis of the intercom signal IC1.

Next, a signal processing circuit 16 of the video camera 2 receives the camera video and audio signal VA which comes from the image pick-up portion 2A and the microphone 2B, a system information signal ST2, and an intercom signal IC2. The signal processing circuit 16 performs the processing such as white balance adjustment and gamma correction with respect to the camera video and audio signal VA, changes the phases of the camera video and audio signal VA, the system information signal ST2, and the intercom signal IC2, and performs time division multiplexing processing, and then delivers to a transmission circuit 17 as a multiplexed signal S6. The transmission circuit 17 amplifies the multiplexed signal S6 to a level at which electro-optic conversion is possible, and delivers it to an electro-optic conversion circuit 18 as a main transmission signal S7.

The electro-optic conversion circuit 18 converts the main transmission signal S7 into an optical signal S8, and transmits it through the optical fiber cable 4 so as to deliver it to a photoelectric conversion circuit 19 of the CCU 3. The photoelectric conversion circuit 19 receives the optical signal S8 and converts it into an electric signal S9, and then delivers it to a reception circuit 20. The reception circuit 20 amplifies the electric signal S9 to a level at which signal process processing can be performed at a signal processing circuit 21, and delivers it to the signal processing circuit 21 as a received signal S10. By performing divide processing of the received signal S10, the signal processing circuit 21 can output the camera video and audio signal VA, the system information signal ST2, and the intercom signal IC2, at the CCU 3 side.

By this, by delivering the camera video and audio signal VA to an editing unit, a switcher, etc. of the succeeding stages, the CCU 3 can perform signal processing of the camera video and audio signal VA by means of the editing unit, the switcher, etc. Subsequently, the CCU 3 delivers the camera video and audio signal VA which has been sent from the editing unit, the switcher, etc. and the returned video and audio signal RVA which is currently being sent on the air with television to the video camera 2, and also delivers the next system information signal ST1 and intercom signal IC1 to the video camera 2.

By the way, a self-diagnostic circuit 22 of the CCU 3 side checks whether the basic operation of the above-mentioned camera-CCU system 1 is being performed normally or not. At here, if the basic operation of the camera-CCU system 1 is not being performed normally, the self-diagnostic circuit 22 displays error information on a displaying division (not shown). While, in the case where transmission of various signals such as the video signal can not be performed in spite of the normal basic-operation of the camera-CCU system 1, the self-diagnostic circuit 22 determines that a defective portion such as breaking of the wire, unsatisfactory connection, and sticking of foreign substance exists in any portion of the optical fiber cable 4, and supplies a disconnected-portion detect command D to a disconnected-portion detecting circuit 23. Receiving the disconnected-portion detect command D, the disconnected-portion detecting circuit 23 stops transmission of the various signals (VA, RVA, ST1, and IC1), and starts detection of the disconnected-portion.

The disconnected-portion detecting circuit 23 delivers a distance measuring transmission pulse SP1 to the electro-optic conversion circuit 12; an optical signal S11 (laser light) which has been generated by the electro-optic conversion circuit 12 on the basis of the distance measuring transmission pulse SP1 is transmitted into the optical fiber cable 4. At this time, the optical signal S11 which is transmitted through the optical fiber cable 4 is reflected by disconnection or unsatisfactory connection of the connector portion or by sticking of foreign substance, and the reflected light component S12 is returned through the same optical fiber cable 4. At this time, after the electro-optic conversion circuit 12 has received the optical signal S11 by means of a photodiode for reception, it receives the reflected light component S12, and then supplies them to the disconnected-portion detecting circuit 23 as a received optical signal S13.

The disconnected-portion detecting circuit 23 eliminates the transmission pulse SP1 which corresponds to the optical signal S11 from the received optical signal S13 to obtain only the reflected pulse which corresponds to the reflected light component S12, and detects the distance to the defective portion on the basis of the time difference T from reception of the transmission pulse SP1 until reception of the reflected pulse. By this, the distance to the defective portion, and the level of the reflected light component with respect to the defective portion are displayed on a monitor.

Figure 3:
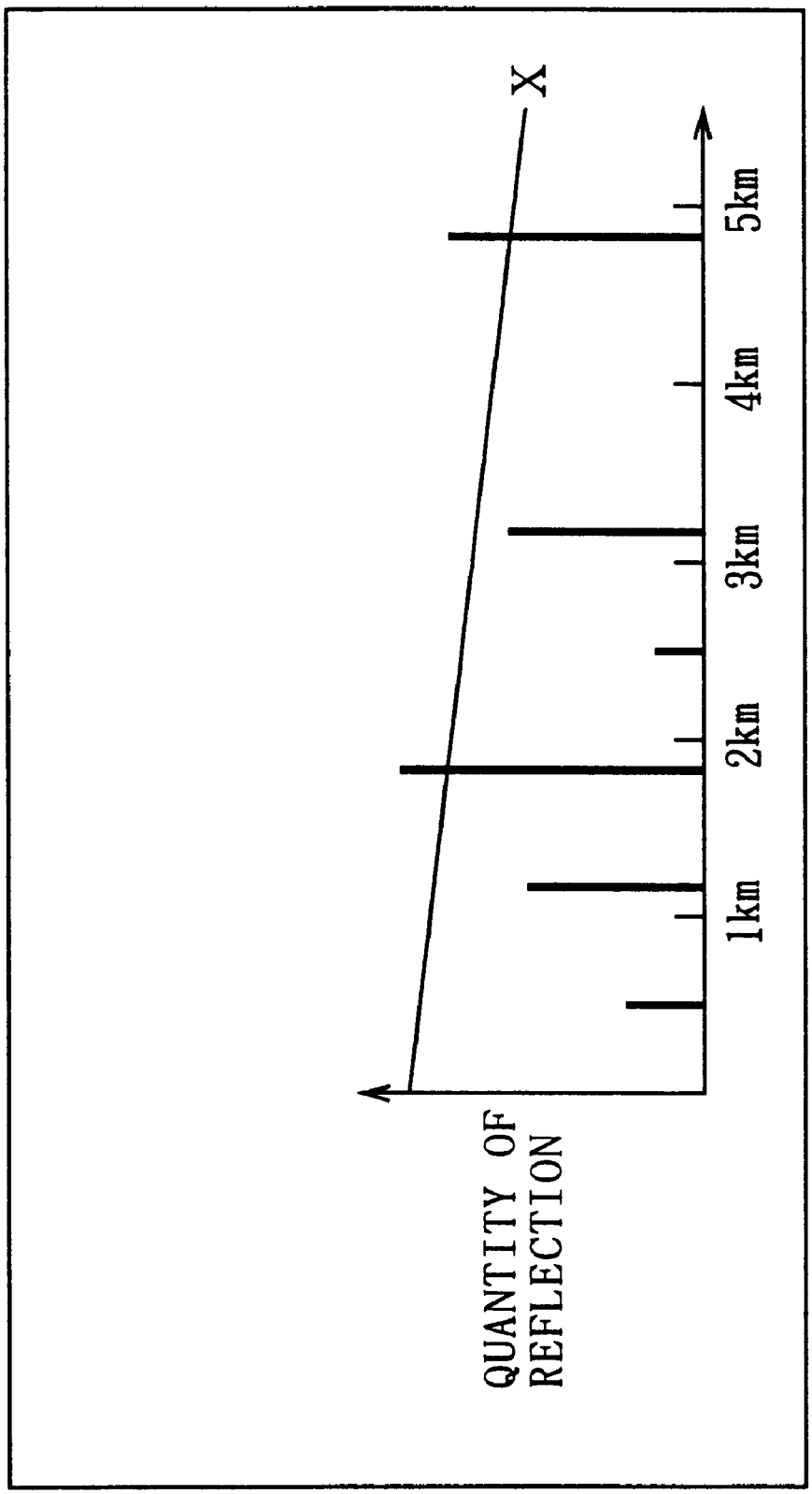
FIG. 3 is a diagram of the monitor which is showing the levels of the reflected-light components in the respective positions on the optical fiber cable.

For instance, as shown in FIG. 3, the axis of the abscissa indicates the distances of the optical fiber cable 4 which have been calculated based on the time differences T, and the axis of the ordinate indicates the signal level of the reflected light component.

Besides, in the same way as the self-diagnostic circuit 22 of the CCU 3, a self-diagnostic circuit 24 of the video camera 2 also checks whether the basic operation of the camera-CCU system 1 is being performed normally or not. Here, if the basic operation of the camera-CCU system 1 is not being performed normally, the self-diagnostic circuit 24 displays error information on a displaying division (not shown). While, in the case where transmission of various signals such as the video signal can not be performed in spite of the normal basic-operation of the camera-CCU system 1, the self-diagnostic circuit 24 determines that a defective portion exists in any portion of the optical fiber cable 4, and supplies a disconnected-portion detect command D to a disconnected-portion detecting circuit 25. Receiving the disconnected-portion detect command D, the disconnected-portion detecting circuit 25 stops transmission of the various signals, and starts detecting of the disconnected-portion.

The disconnected-portion detecting circuit 25 supplies a distance measuring transmission pulse SP1 to the electro-optic conversion circuit 18. The electro-optic conversion circuit 18 converts the distance measuring transmission pulse SP1 into an optical signal S14 and transmits it through the optical fiber cable 4.

At this time, the optical signal S14 which is transmitted through the optical fiber cable 4 is reflected if disconnection or unsatisfactory connection exists at the connector portion or if a foreign substance is stuck on the connector portion, and is returned through the same optical fiber cable 4 as the reflected light component S15. In this case, after transmitting the optical signal S14, the electro-optic conversion circuit 18 receives the reflected light component S15, and supplies them to the disconnected-portion detecting circuit 25 as a received optical signal S16.

The disconnected-portion detecting circuit 25 eliminates the transmission pulse SP1 which corresponds to the optical signal S14 from the received optical signal S16 to obtain only the reflected pulse which corresponds to the reflected light component S15, and detects the distance to the defective portion on the basis of the time duration T from reception of the transmission pulse SP1 until reception of the reflected pulse. By this, the distance to the defective portion, and the level of the reflected light component S15 with respect to the defective portion are displayed within the view-finder of the video camera 2.

Thus, the camera-CCU system 1 is provided with the disconnected-portion detecting circuit 25 in the CCU 3, and provided with the disconnected-portion detecting circuit 23 in the video camera 2, so the defective portion can be detected from either side.

Figure 4:
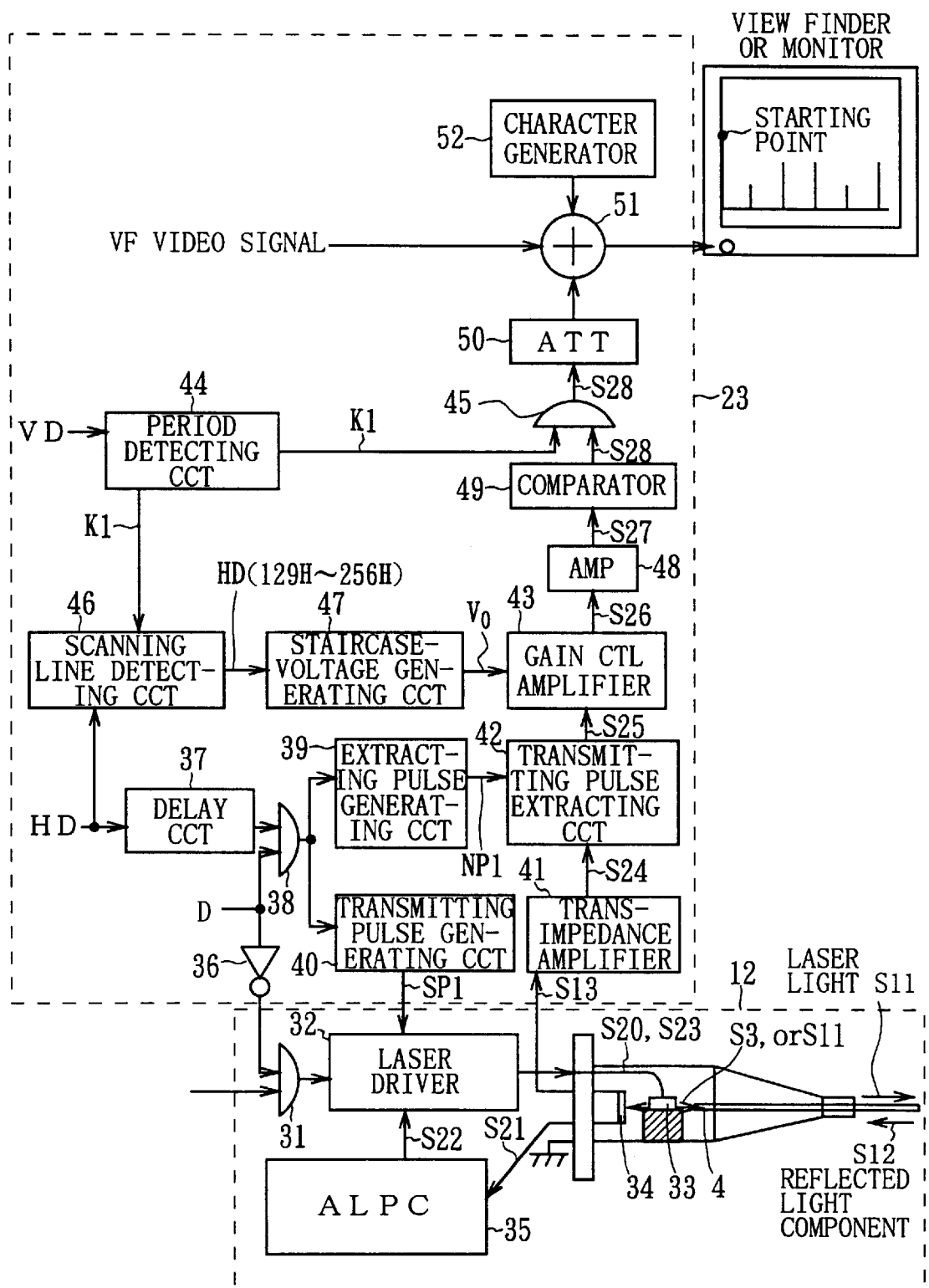
FIG. 4 is a block diagram showing constitutions of the disconnected-portion detecting circuit and the photoelectric conversion circuit.

(3) Configurations of the Disconnected Portion Detecting Circuit and the Photoelectric Conversion Circuit Next, configurations of the disconnected-portion detecting circuit 23 which is a defective portion detecting device and the electro-optic conversion circuit 12 are described, referring to FIG. 4. Because of the same circuit configurations, description of the disconnected-portion detecting circuit 25 and the electro-optic conversion circuit 18 are omitted.

Usually, when a video signal and others are being transmitted in the camera-CCU system 1, the main transmission signal S2 is inputted to one of the input-terminals of an AND gate 31 of the electro-optic conversion circuit 12 from the transmission circuit 11, and a "H" level signal is inputted to the other input-terminal from the disconnected-portion detecting circuit 23. By this, the AND gate 31 becomes an open state, and issues the main transmission signal S2 toward a laser driver circuit 32.

The laser driver 32 delivers a driving signal S20 which has been generated on the basis of the main transmission signal S2 to a laser diode 33. The laser diode 33 generates the optical signal S3 (laser light) according to the driving signal S20, and transmits it to the video camera 21 side through the optical fiber cable 4.

A light-power detect diode 34 is provided to detect the light-power of the optical signal S3; it detects how much light-power of optical signal S3 is being outputted from the laser diode 33 at present, and delivers a detected signal S21 corresponding to the light power which has been detected to an automatic laser-power control circuit 35.

In order to keep the output level of the optical signal S3 constant, the automatic laser-power control circuit 35 generates a control signal S22 on the basis of the detected signal S21, and delivers it to the laser driver circuit 32.

The laser driver circuit 32 delivers the driving signal S20 to the laser diode 33, adjusting it, on the basis of the control signal S22, such that the optical signal S3 of the constant light-power is always outputted.

As to the disconnected-portion detecting circuit 23, when a fiber disconnected-portion detect command D of "H" level has been inputted to an inverter 36 from the self-diagnostic circuit 22, the inverter 36 inverts the fiber disconnected-portion detect command D of "H" level, and delivers the "L" level signal to the other input-terminal of the AND gate 31 of the electro-optic conversion circuit 12. In this case, the AND gate 31 is not opened, and so the main transmission signal S2 is not delivered to the laser driver circuit 32.

When a fiber disconnected-portion detect command D of "L" level has been inputted to an inverter 36 of the disconnected-portion detecting circuit 23 from the self-diagnostic circuit 22, the inverter 36 inverts the fiber disconnected-portion detect command D of "L" level, and delivers the "H" level signal to the AND gate 31 of the electro-optic conversion circuit 12. In this case, the AND gate 31 becomes the opened state, and delivers the main transmission signal S2 to the laser driver circuit 32.

That is, in the case where the fiber disconnected-portion detect command D of "H" level has been inputted from the self-diagnostic circuit 22, the disconnected-portion detecting circuit 23 stops transmission of the main transmission signal S2 and enters the fiber disconnected-portion detecting mode, while, in the case where the fiber disconnected-portion detect command D of "L" has been inputted from the self-diagnostic circuit 22, the disconnected-portion detecting circuit 23 becomes normal mode, and the main transmission signal S2 is transmitted.

Then, entering in the fiber disconnected-portion detecting mode, the disconnected-portion detecting circuit 23 takes in a horizontal synchronized signal (hereinafter, this is referred to as HD) of about 3 [μsec] of pulse width within a delay circuit 37. The delay circuit 37 delays the HD by 12 [μsec] and delivers it to one input-terminal of an AND gate 38.

The delay circuit 37 is to adjust the position of the starting point displayed on the view finder.

More specifically, in this embodiment, a laser diode 33 emits light on the basis of the timing of the HD. The HD exists in the horizontal blanking period. Therefore, if the laser diode emits light at the timing of the HD itself, the starting point can not be displayed on the view finder. Accordingly, the display circuit 37 is provided.

Besides, the disconnected-portion detecting circuit 23 takes in the HD which has been delayed by 12 [μsec] from one input-terminal of the AND gate 38, and takes in the fiber disconnected-portion detect command D of "H" level from the other input-terminal, so as to open the AND gate 38 and deliver the HD which has been delayed by 12 [μsec] to a extracting pulse generating circuit 39 and a transmission-pulse generating circuit 40.

The transmission-pulse generating circuit 40 sequentially generates the transmission pulse SP1 of about 0.5 [μsec] of pulse width in a horizontal scanning cycle on the basis of the HD which has been delayed by 12 [μsec], and delivers it to the laser driver 32 of the electro-optic conversion circuit 12. While, the extracting pulse generating circuit 39 sequentially generates the extracting pulse NP1 of about 1.5 [μsec] of pulse width in a horizontal scanning cycle on the basis of the HD which has been delayed by 12 [μsec], and delivers it to a transmission-pulse extracting circuit 42.

The laser driver 32 generates a driving signal S23 for light-emitting the laser diode 33 during the pulse width of about 0.5 [μsec] on the basis of the transmission pulse SP1, and delivers it to the laser diode 33. The laser diode 33 radiates the optical signal S11 (laser light) on the basis of the driving signal S23, and transmits it through the optical fiber cable 4. If one portion of the optical signal S11 is reflected because of disconnection or unsatisfactory connection of the optical fiber cable 4 or sticking of foreign substance, the reflected light component S12 is returned through the same optical fiber cable 4 and received by the light-power detect diode 34 which is comprised of a photo-diode.

At this time, the light-power detect diode 34 directly receives the optical signal S11 which has been radiated by the laser diode 33, and thereafter, receives, the number of times corresponding to the number of the disconnections, etc. the reflected-light components S12 which are so weak that they are one several thousands of the optical signal S11. That is, time needed for coming back of the reflected light component S12 which is received by the light-power detect diode 34 is different according to the reflected position in the optical fiber cable 4 (a time difference T is generated).

Here, the cable length Di until each reflected position in the optical fiber cable 4 where the reflected light component S12 has been detected is represented by the next equation:

$$Di = \frac{C \times T}{2\sqrt{N}} \quad (1)$$

where the refractive index of the optical fiber is designated as N, the time difference between the time when the optical signal S11 is received and the time when the reflected light component S12 is received is designated as T, and the light velocity ($3 \times 10^{10}$ [cm/sec]) is designated as C.

The light-power detect diode 34 is adapted to output the detected optical signal S11 and the reflected light component S12 to a trans-impedance amplifier 41 of the disconnected-portion detecting circuit 23 as the received optical signal S13.

The trans-impedance amplifier 41, which is provided as an impedance converting amplifier, lowers the output impedance, and amplifies the received optical signal S13 to the signal level which can be exposed to signal processing, and then delivers it to the transmission-pulse extracting circuit 42 as an electric signal S24. The transmission-pulse extracting circuit 42 eliminates only the transmission pulse SP1 out of the electric signal S24 by means of the extracting pulse NP1 which has been generated in the extracting pulse generating circuit 39, and delivers the remaining reflected-light component to a gain controlling amplifier 43 as a reflected pulse S25.

By the way, the disconnected-portion detecting circuit 23 takes in the vertical synchronized signal (hereinafter, this is referred to as the VD) into a period detecting circuit 44. The period detecting circuit 44 counts the horizontal scanning periods 1H to 128H on the basis of the VD, and then, during only the period when it is counting the horizontal scanning periods from 129H to 256H, delivers a period detection signal K1 of "H" level to an input-terminal of an AND gate 45 and also to a scanning-line detecting circuit 46.

Further, during the period when the period detection signal K1 of "L" level is supplied, the scanning-line detecting circuit 46 masks the HD and outputs nothing. During the period when the period detection signal K1 of "H" level is supplied, the scanning-line detecting circuit 46 outputs the HD itself and supplies it to a staircase-voltage generating circuit 47.

The staircase-voltage generating circuit 47 generates a staircase voltage Vo, whose output voltage is lowered to the lowest level during the scanning line scans from 1H to 128H, and then, during 129H to 256H, the level of the output voltage is raised by one step at every increasing of 1H; the circuit 47 then supplies the voltage Vo to the gain controlling amplifier 43. During 129H to 256H, the gain controlling amplifier 43 raises the gain of the gain controlling amplifier 43 by one step at every increase of 1H, on the basis of the staircase voltage Vo which has been sectioned into 128 steps of 129H to 256H, and then delivers the reflected pulse S26 which has been gain-controlled to an amplifier 48.

The amplifier 48 further amplifies the reflected pulse S26 whose gain has been raised on the basis of the staircase voltage Vo by the predetermined gain, and then delivers it to a comparator 49 as a reflected pulse S27. The comparator 49 compares the level of the reflected pulse S27 with a reference voltage Vr; one which is larger than the reference voltage Vr is designated as "L", and one which is smaller than the reference voltage Vr is designated as "L", and they are delivered to the AND gate 45 as a binary data S28.

When the AND gate 45 has received the "H" level signal from the period detecting circuit 44 and also received the binary data S28 from the comparator 49, it becomes open-state, and delivers the binary data S28 to an attenuator (hereinafter, this is referred to as an ATT) 50.

The ATT 50 lowers the output level of the binary data S28 which has been taken in from the comparator 49 via the AND gate 45 to about 0.7 $[V_{p-p}]$ which is the level of the output of a VF image signal which is observed by a cameraman in the view-finder, and delivers it to an adder 51. Meanwhile, a character generator 52 generates a graph having the axis of ordinates for representing the signal level of the reflected light component and the axis of the abscissa for representing the distances to the reflected point in the optical fiber cable 4 which have been calculated on the basis of the time differences T, and then delivers them to the adder 51. The adder 51 synthesizes analogously the reflected pulse of each reflected position in the optical fiber cable 4 on a graph which has been generated by the character generator 52, and moreover outputs it superimposed on the VF image signal.

Therefore, during 129H to 256H, the gain of the gain controlling amplifier 43 is raised on the basis of the staircase gain G in proportion to scanning of the scanning line H toward the lower part of the screen, and the level of the reflected pulse S27 is compared with the reference voltage Vr, so as to obtain the binary data S28; the binary data S28 is outputted such that the reflected light component is outputted on the half area of the lower part of the screen. In this way, the disconnected-portion detecting circuit 23 is adapted to analogously display the signal level of the reflected light component as a bar graph on the approximate lower-half portion of the screen in the view finder.

(3-1) Configuration of the Laser Driver and the Automatic Laser-Power Control Circuit As shown in FIG. 5, the laser driver 32 is comprised of a pair of NPN-type transistor $Q_1$ and $Q_2$. The main transmission signal S2 is usually inputted to the base of the transistor $Q_1$, however, when the mode has became the fiber disconnected-portion detecting mode, the transmission pulse SP1 is inputted to the base of the transistor $Q_1$. Also, the collector of the transistor $Q_1$ is grounded via a damping resistor $R_1$ and the laser diode 33.

At here, if a lead wire for connecting the collector of the transistor $Q_1$ with the laser diode 33 becomes long, the lead wire operates as an inductance, therefore, a stray capacity appears in the lead wire portion, such that a LC resonance circuit is formed. By this, the impedance becomes high, and the frequency characteristic becomes unstable. Therefore, the damping resistor $R_1$ for suppressing such a change of the frequency characteristic is connected between the collector of the transistor $Q_1$ and the laser diode 33.

On the other hand, the base of the transistor $Q_2$ is connected to the base power-supply $V_1$, and the collector of it is grounded. Besides, the transistors $Q_1$ and $Q_2$ are connected with respective emitters, and are connected the negative power-supply $V_{DD}$ of −5 [V], via a variable current-source 60 whose connection point is common. Therefore, the laser driver 32 is formed such that when the transmission pulse SP1 of "H" level has been inputted to the base of the transistor $Q_1$ (in this case, the original main transmission signal S2 is not supplied), the transistor $Q_2$ becomes "OFF" and the transistor $Q_1$ becomes "ON", so that the current flows through the laser diode 33 so as to cause it to emit a light.

In addition, when the transmission pulse SP1 is not inputted to the base of the transistor $Q_1$ of the laser driver 32 and the level becomes "L" level, the transistor $Q_2$ becomes "ON" and the transistor $Q_1$ becomes "OFF", so that the current is stopped from flowing through the laser diode 33. The light emission is halted. The laser driver 32 operates at high speed in emitting the light by means of the laser diode 33 on the basis of the inputted transmission pulse SP1 of "H" level; however, at the time to halt the light emission, the trailing edge of the wave-form of the input-pulse trails has a decay characteristic as shown in FIG. 6A, since there is not a route to discharge the electric charge which has been stored within the laser diode 33.

During the period of this trailing portion, it is not possible to detect the reflected light component whose level is much smaller than the level of input pulse of this period. So, the laser driver 32 is provided with a resistor $R_2$ of 2 [kΩ], in parallel with the laser diode 33. By this, the stored electric charge of the laser diode 33 is discharged and the trailing edge of the pulse drops faster; in this way, as shown in FIG. 6B, the laser driver 32 approaches the ideal wave-form of the pulse shown in FIG. 6C.

The automatic laser-power control circuit 35 is comprised of operational amplifier OP1, and used as a negative feedback system for keeping the light-power of the optical signal S3 which has been detected by the light-power detect diode 34 constant. That is, one power-supply terminal of the operational amplifier OP1 is grounded, and the other power-supply terminal is connected to the negative power-supply $V_{DD}$ of −5 [V].

The operational amplifier OP1 takes in the optical signal S3 which has been detected by the light-power detect diode 34 within the inversion input-terminal as the transmission pulse SP1, takes in the power-supply output of the reference voltage $V_2$ within the non-inversion input-terminal, and negative-feedbacks the output current via the resistor $R_3$.

Therefore, the operational amplifier OP1 compares the voltage of the transmission pulse SP1 which has been inputted from the inversion input-terminal with the voltage of the reference voltage $V_2$; when it is larger than the voltage level of the reference voltage $V_2$, the quantity of the current which flows in a variable current-source 60 is lowered, and when it is smaller than the voltage level of the reference voltage $V_2$, the quantity of the current which flows in the variable current-source 60 is increased.

The noise component which has occurred at the time of the fiber disconnected-portion detecting mode enters the disconnected-portion detecting circuit 23 of the anode side from the cathode of the light-power detect diode 34, and the S/N ratio is aggravated hereby. So, a resistor $R_4$ is connected to one end of the light-power detect diode 34, and a capacitor $C_1$ is connected to one end of the resistor $R_4$, so that a CR filter is formed. By this, the noise component which enters from the cathode of the light-power detect diode 34 is eliminated by means of the CR filter, before it enters the disconnected-portion detecting circuit 23 of the anode side, and so aggravation of the S/N ratio can be prevented.

(3-2) Configuration of the Trans-Impedance Amplifier

Figure 7:
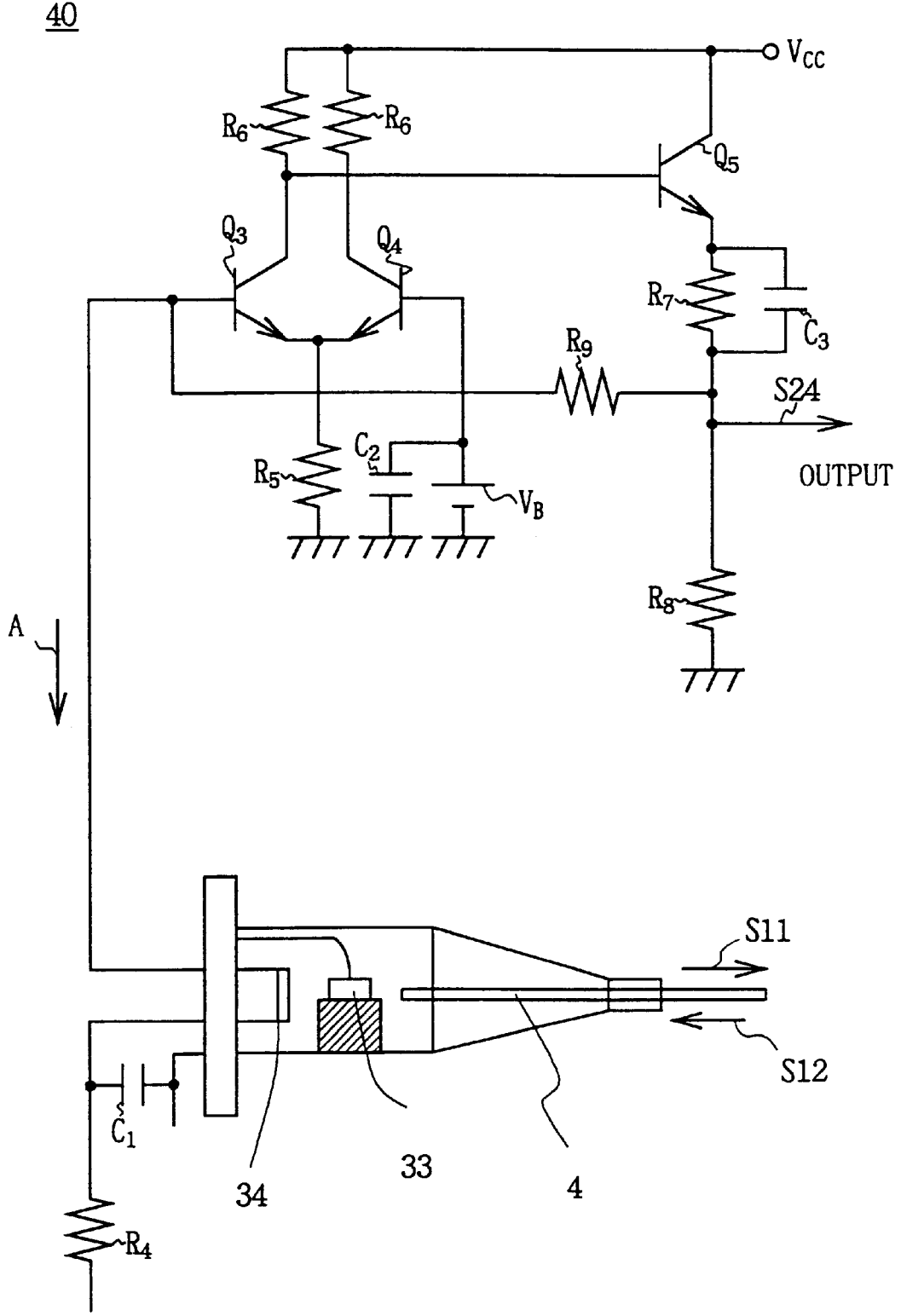
FIG. 7 is a circuit diagram showing a first constitution of the trans-impedance amplifier.

As shown in FIG. 7, the respective emitters of one pair of NPN-type transistors $Q_3$ and $Q_4$ of the trans-impedance amplifier 40 are grounded via an emitter resistor $R_5$ (1.7 [kΩ]), and the emitter resistor $R_5$ is used as the constant-current source of the transistors $Q_3$ and $Q_4$. On the other hand, the respective collectors of the transistors $Q_3$ and $Q_4$ are connected to the DC power supply $V_{CC}$ of +5 [V], via resistor $R_6$ (2 [kΩ]) respectively, and also the collector of the transistor $Q_3$ is connected to the base of the transistor $Q_5$. The base of the transistor $Q_4$ is grounded via the base power supply $V_B$ of 2.5 [V], and a capacitor $C_2$ is connected to the base power supply $V_B$ in parallel.

In the transistor $Q_5$, the collector of it is connected to the DC power supply $V_{CC}$, and the emitter of it is grounded via an emitter resistor $R_7$ and a resistor $R_8$ (1.7 [kΩ]); a by-pass capacitor $C_3$ is connected to the emitter resistor $R_7$ in parallel. Therefore, the emitter output of the transistor $Q_5$ can be divided by the emitter resistor $R_7$ and the resistor $R_8$ and taken out, without lowering of the gain by the by-pass capacitor $C_3$. Besides, the trans-impedance amplifier 40 is adapted to lower the output impedance by means of an emitter follower which is composed of the transistor $Q_5$ and the emitter resistor $R_7$.

By the way, one end of a feedback resistor $R_9$ is connected to the connection point of the base resistor $R_7$ and the resistor $R_8$, and the other end of the feedback resistor $R_9$ is connected to the base of the transistor $Q_3$. By this, negative feedback of the emitter output of the transistor $Q_5$ toward the base of the transistor $Q_3$ is performed, via the feedback resistor $R_9$. Since the output voltage (amplitude level) of the trans-impedance amplifier 40 is represented by feedback resistance value×photoelectric current, if the value of the feedback resistance of the feedback resistor $R_9$ has been set to a large value, then larger output voltage can be taken out, proportionally.

Therefore, the trans-impedance amplifier 40 is able to amplified the received optical signal S13 (the optical signal S11 and the reflected light component S12) in a good state of the S/N ratio, by setting the feedback resistance value of the feedback resistor $R_9$ (20 [kΩ]) to a large value.

In fact, the trans-impedance amplifier 40 is arranged such that the electric potentials of the respective bases of the transistors $Q_3$ and $Q_4$ become equal when the transistors $Q_3$ and $Q_4$ are acting linearly, therefore, if the feedback resistance value of the feedback resistor $R_9$ is doubled, then the output voltage is doubled too, and, at the same time, the output noise becomes $\sqrt{2}$ times. Therefore, the S/N ratio becomes $1/\sqrt{2}$ times.

However, in the case of the trans-impedance amplifier 40, when the light-power detect diode 34 has received a large light component like the optical signal S11 out of the received optical signal S13, a large amount of photoelectric current flow out unwillingly from the DC power supply $V_{CC}$ in a direction shown by the arrow A in FIG. 7, and so the electric potential of the base of the transistor $Q_3$ is lowered.

As a result, the transistor $Q_3$ goes "OFF" and the transistor $Q_4$ goes "ON", so that the transistor $Q_4$ is saturated and a linear amplitude operation becomes impossible.

Figure 8:
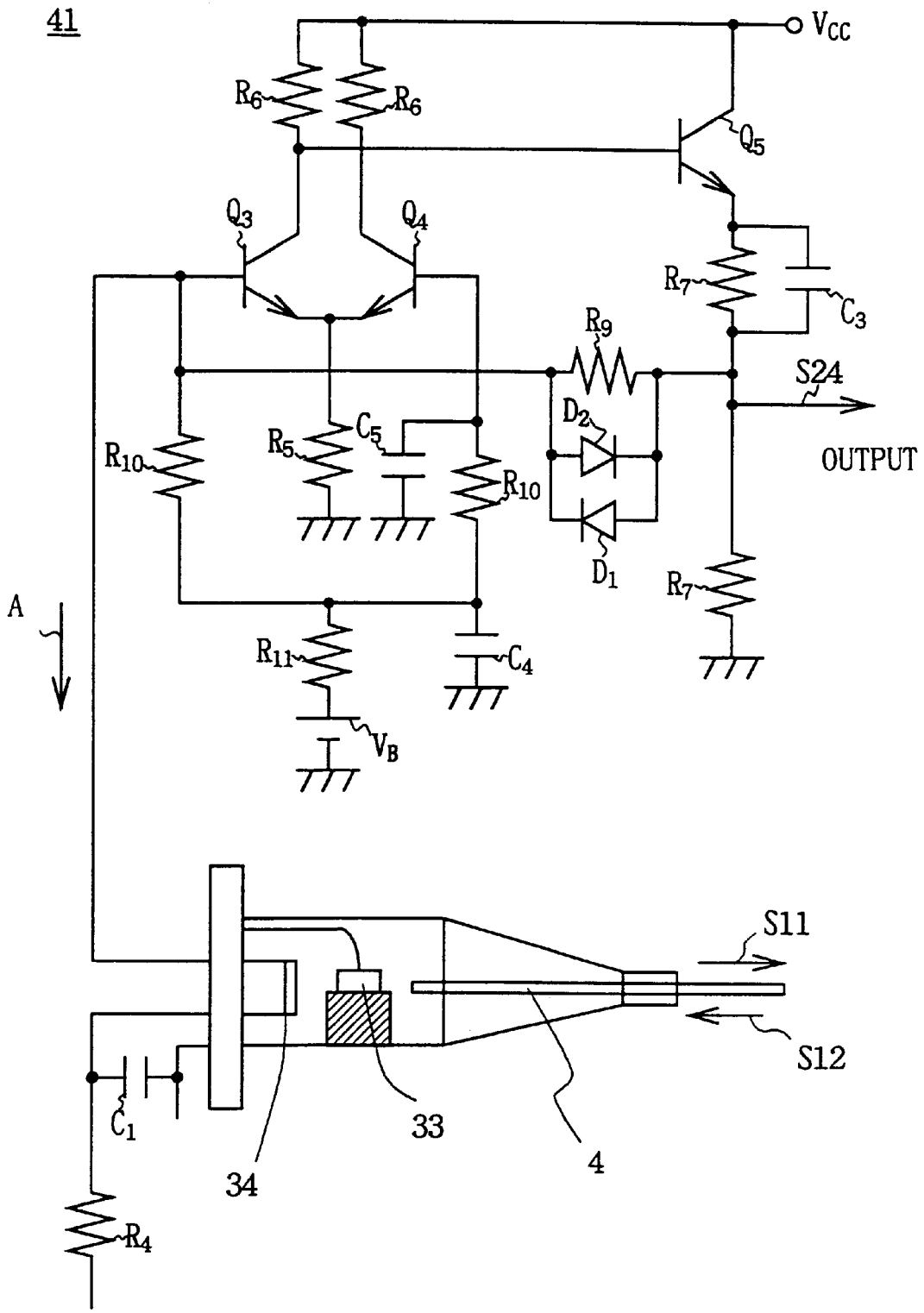
FIG. 8 is a circuit diagram showing a second constitution of the trans-impedance amplifier.

So, as shown in FIG. 8, in the trans-impedance amplifier 41, Schottky diodes $D_1$ and $D_2$ may be provided in parallel with the feedback resistor $R_9$. By this, when the electric potential difference which occurs between the both ends of the feedback resistor $R_9$ exceeds the certain voltage value, the Schottky diode $D_1$ begin to conduct and by-passes the feedback resistor $R_9$, and the feedback current is forcedly fed back.

In this case, the output voltage is represented as resistance value of Schottky diode $D_1$ ×photoelectric current; the resistance value of the Schottky diode $D_1$ is low, so that the amplitude level of the output voltage is not raised and not modified practically. In other words, the amplitude level of the output voltage does not rise with the result that the electric potential of the base of the transistor $Q_5$ is lowered, that is, the collector current of the transistor $Q_3$ flows, so that the transistors $Q_3$ and $Q_4$ are balanced.

Therefore, the transistors $Q_3$ and $Q_4$ are not saturated, so that the amplifying operation can be performed linearly.

However, by only setting of the value of the feedback resistance of the feedback resistor $R_9$ to a large value and providing the Schottky diodes $D_1$ and $D_2$ in a parallel arrangement with the feedback resistor $R_9$, the electric potential difference which occurs between both ends of the feedback resistor $R_9$ is large even at the time when the photoelectric current does not flow, that is, the time when the received optical signal S13 is not inputted, so that it exceeds the barrier of the Schottky diode $D_1$, and the bias current is given to the base of the transistor $Q_3$, unwillingly.

In order to avoid such a situation, a bias current of the specific electric potential is supplied to the respective bases of the transistors $Q_3$ and $Q_4$ from the other system. That is, by supplying a bias current to the respective bases of the transistors $Q_3$ and $Q_4$ from a base power-supply $V_B$ of 2.5 [V]via the respective base resistors $R_{10}$ (5.1 [kΩ]), and selecting the resistance values of the emitter resistors $R_7$ of the transistor $Q_5$ to (0.1 [kΩ]), the electric potential difference is not generated across the feedback resistor $R_9$.

By this, even in the case where the received optical signal S13 is not inputted (the photoelectric current does not flow), the Schottky diodes $D_1$ is not forced to conduct. By the way, the Schottky diode $D_2$ is connected to the Schottky diode $D_1$ in a reverse direction, and placed in consideration of safety so as not to satisfy it in even the case where a large pulse component or an inverse pulse component has been received.

Here, the trans-impedance amplifier 41 is arranged in such a manner that the connection point of the respective base resistors $R_{10}$ and the base power-supply $V_B$ are connected through a resistor $R_{11}$ (0.1 [kΩ]), and a capacitor $C_4$ is added to the resistor $R_{11}$ in parallel. In this way, the resistor $R_{11}$ and the capacitor C4 form a CR filter, so that a noise component which has occurred from the base power supply $V_B$ can be eliminated. Besides, the base resistor $R_{10}$ and a capacitor $C_5$, which has been added to it in parallel, form a CR filter in like manner, so that a noise component which is due to the base resistor $R_{10}$ can be eliminated.

In this way, the trans-impedance amplifier 41 may amplify the received optical signal S13, which is inputted, to an amplitude level at which signal processing can be performed, and output it as a low-impedance electric signal S24.

(3-3) Configuration of the Transmission-Pulse Extracting Circuit

As shown in FIG. 9, in the transmission-pulse extracting circuit 42, the connection point of the respective emitters of a pair of NPN-type transistors $Q_6$ and $Q_7$ is connected to the collector of the transistor $Q_8$, and the base of the transistor $Q_6$ is grounded via the base power-supply $V_{B1}$, and the base of the transistor $Q_7$ is used as the inputting end of the extracting pulse NP1.

In the transistor $Q_8$, the base of it is grounded via the electric power-supply $V_{B2}$, and the emitter of it is grounded via an emitter resistor $R_{12}$. In this case, the transistor $Q_8$ is a constant-current source, by which the base current flows through the transistors $Q_6$ and $Q_7$. Besides, the transistors $Q_6$ and $Q_7$ function as a so-called switch, which causes the transistor $Q_7$ to go to "ON" state and the transistor $Q_6$ to go to "OFF" state when the amplitude level of the extracting pulse NP1 which is inputted to the base of the transistor $Q_7$ is larger than the amplitude level of the base power-supply $V_{B1}$ which is the standard, and causes the transistor $Q_7$ to go to "OFF" state and the transistor $Q_6$ to go to "ON" state when smaller than the level.

In addition, the collector of the transistor $Q_6$ is connected to the connection point of the respective emitters of the transistors $Q_9$ and $Q_{10}$, and the collector of the transistor $Q_7$ is connected to the connection point of the respective emitters of the transistors $Q_{11}$ and $Q_{12}$.

The respective collectors of the transistors $Q_9$ and $Q_{11}$ are connected to the DC power supply $V_{CC}$ of 5 [V] via the resistor $R_{l3}$. Similarly, the respective collectors of the transistors $Q_{10}$ and $Q_{12}$ are connected to the DC power supply $V_{CC}$ via the resistor $R_{14}$.

By the way, the connection point of the respective bases of the transistors $Q_{10}$ and $Q_{11}$ are grounded via the base power-supply $V_{B3}$, and the base of the transistor $Q_{12}$ is grounded via the base power-supply $V_{B3}$ in like manner, and the base of the transistor $Q_9$ is used as the input end of the electric signal S24.

Besides, the collector of the transistor $Q_{12}$ is connected to the base of the transistor $Q_{13}$, and the collector of the transistor $Q_{13}$ is connected to the DC power supply $V_{CC}$ and the emitter of it is grounded via the emitter resistor $R_{15}$, such that the reflected pulse S25 is amplified by the gain in response to the magnitude of the resistance value of the emitter resistor $R_{15}$ and then outputted.

In fact, as shown in FIG. 10A, the electric signal S24 is comprised of the transmitting pulse SP1 and the reflected light component, and, at the time when the transmitting pulse SP1 out of the electric signal S24 has been inputted to the base of the transistor $Q_9$, the extracting pulse NP1 of "H" level is inputted to the base of the transistor $Q_7$. In this case, the transistors $Q_7$, $Q_{11}$, and $Q_{12}$ become "ON" state, and the transistors $Q_6$, $Q_9$, and $Q_{10}$ become "OFF" state.

At this time, the input of the reflected light component out of the electric signal S24 is not accepted, because the transistors $Q_6$, $Q_9$, and $Q_{10}$ are staying in "OFF" state. Therefore, only the DC voltage of the base power-supply $V_{B3}$ is amplified to the predetermined level by the transistors $Q_{11}$, $Q_{12}$, and $Q_{13}$, and then outputted.

By the way, the laser light which has been emitted by the transmitting pulse SP1 may have the fall of the transmitting pulse SP1 whose form is not sharp but the edge trails, and at the same time, may have a waveform trailing. In order to eliminate the laser light emitted by the transmitting pulse SP1 without any problem even if the above-described phenomenon occurs, as shown in FIG. 10B, the pulse width of the extracting pulse NP1 is set to a sufficiently larger value than the pulse width of the transmitting pulse SP1 in the transmitting pulse extracting circuit 42.

Subsequently, when the extracting pulse NP1 which is inputted to the base of the transistor $Q_7$ has became "L" level, the transistors $Q_7$, $Q_{11}$, and $Q_{12}$ become "OFF" state, and the transistors $Q_6$, $Q_9$, and $Q_{10}$ become "ON" state. So, only the reflected light component out of the electric signal S24 which is inputted to the base of the transistor $Q_9$ is amplified, and outputted as the reflected pulse S25.

The transmitting pulse extracting circuit 42 is able to cause the transmitting pulse SP1 to do not appear as a waveform during the time when the extracting pulse NP1 of "H" level is being inputted to the base of the transistor $Q_7$ as shown in FIG. 10C, by setting the voltage level of the base power-supply $V_{13}$ to the "L" level of the electric signal S24, and amplifying the voltage level of the base power-supply $VB_3$ in the same way as the reflected component.

In this way, the transmitting pulse extracting circuit 42 is arranged such that it is able to output the reflected pulse S25 wherein the transmitting pulse SP1 out of the inputted electric signal S24 has been eliminated.

(3-4) Configuration of the Staircase-Voltage Generating Circuit

Figure 11:
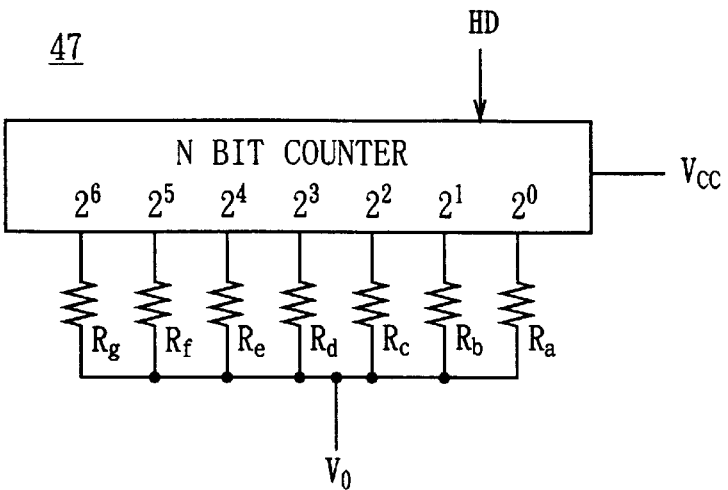
FIG. 11 is a schematic diagram showing a constitution of the staircase-voltage generating circuit.

The staircase-voltage generating circuit 47 is a circuit of which "H" level and "L" level outputs are low-impedance both, and the respective counter outputs are provided with the respective resistors Ra to Rg as shown in FIG. 11; designating the value of the reference resistance as Rx, the resistance values of the resistors Ra to Rg are represented by the following equation:

$$Ra = \frac{Rx}{2^0} \qquad (2)$$

$$Rb = \frac{Rx}{2^1}$$

$$Rc = \frac{Rx}{2^2}$$

$$\vdots$$

$$Rg = \frac{Rx}{2^6}$$

(Rx: the reference resistance value)

In this case, the reference resistance value Rx is a fixed value, and so the output voltage Vo of the staircase-voltage generating circuit 47 becomes such voltage-steps that the power-supply voltage $V_{CC}$ has been divided by the number of bits, and during the horizontal scanning period of 129H to 256H, the staircase voltage Vo which is corresponding to the respective horizontal scanning periods is generated. That is, in the staircase-voltage generating circuit 47, the output voltage Vo is represented by the following equation:

$$Vo = \frac{n \cdot V_{CC}}{2^6 + 2^5 + 2^4 + 2^3 + 2^2 + 2^1 + 2^0} \quad (3)$$

(N: the number of input pulse e.g., when 129 H, it is "1"

when 130 H, it is "2")

where the number of the pulses of the inputted HD is designated as n.

Hereupon, the denominator is the total sum (=127) of the number of the bits of each counter. Therefore, the staircase-voltage generating circuit 47 may output the staircase voltage Vo which has been segmented into 128 stages, when the HDs which are corresponding to the scanning periods of 129H to 256H have been inputted.

Figure 12:
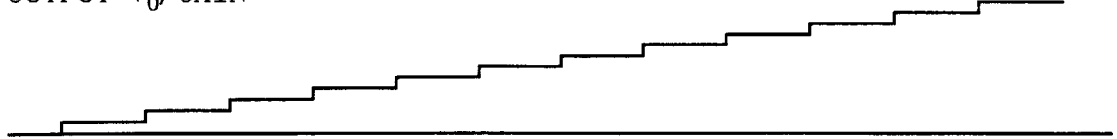
FIG. 12 is a schematic diagram showing the staircase-voltage of 129H to 256H.

In fact, as shown in FIG. 12, in the staircase-voltage generating circuit 47, the HD is not inputted during respective vertical scanning period of 0 to 128H, and the HD is firstly inputted at 129H. At 129H, when the first time HD of is inputted, n=1 and the output voltage Vo calculated from the equation (3) becomes the lowest voltage value. In the staircase-voltage generating circuit 47 shown in FIG. 11, as shown in the output Vo of FIG. 12, only the output of $2^0$ becomes high at 129H. Next, in the staircase-voltage generating circuit 47, only the output of $2^1$ becomes high at 130H. In this way, the staircase-voltage generating circuit 47 generates the staircase voltage Vo based on the HD at each horizontal scanning period of 129H to 256H, and supplied it to the gain controlling amplifier 43. The gain controlling amplifier 43 is the gain being proportional to the staircase voltage Vo, and amplifies the reflected pulse S25. Then, counting to 129H, the counting value is reset by the control signal (not shown) of the timing on the basis of the VD. These operation are repeated at the next vertical scanning period.

In this way, the staircase-voltage generating circuit 47 generates the staircase voltage Vo on the basis of the respective HDs of 129H to 256H, and supplies it to the gain controlling amplifier 43, thereby increasing the gain of the gain controlling amplifier 43 for each 1H with respect to 129H to 256H.

Figure 13:
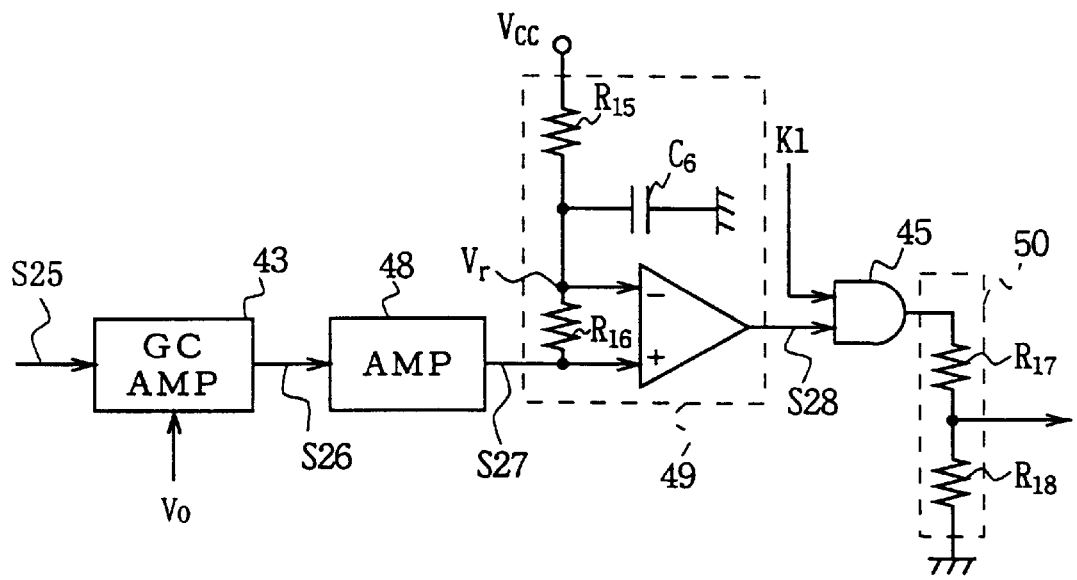
FIG. 13 is a block diagram showing constitutions of the gain controlling amplifier, the comparator, and the screen gate division.

(3-5) Configuration of the Gain Control Amplifier, the Comparator, and the Screen Gate Division As shown in FIG. 13, the reflected pulse S25 which has been outputted from the transmitting pulse extracting circuit 42 is inputted to the gain controlling amplifier 43. The gain controlling amplifier 43 delivers the reflected pulse S26 amplified by the gain which has been increased with the staircase voltage Vo by one step every time 1H during the time of 129H to 256H, to the amplifier 48. The amplifier 48 further amplifies the reflected pulse S26 amplified by the gain which has been increased step by step, and delivers it to the non-inverting input-terminal of the comparator 49 as the reflected pulse S27.

The comparator 49 may divide the output voltage of the DC power-supply $V_{CC}$ by means of the resistors $R_{15}$ and $R_{16}$ and smoothes it by means of the capacitor $C_6$ to generate the reference voltage Vr of which high-frequency components have been eliminated, and may compare the reference voltage Vr with the reflected pulse S27, so as to deliver them to the screen gate 45 as the binary data S28.

The screen gate 45 inputs, from the period detecting circuit 44, the period detection signal K1 of "H" level which represents that the scanning timing has entered in the period of 129H to 256H, and delivers the binary data S28 to the voltage divider ATT 50, when the binary data S28 has been also inputted from the comparator 49.

The ATT 50 divides the amplitude level of the binary data S28 by means of the resistors $R_{17}$ and $R_{18}$ so as to lower it to about 0.7.

Figure 14:
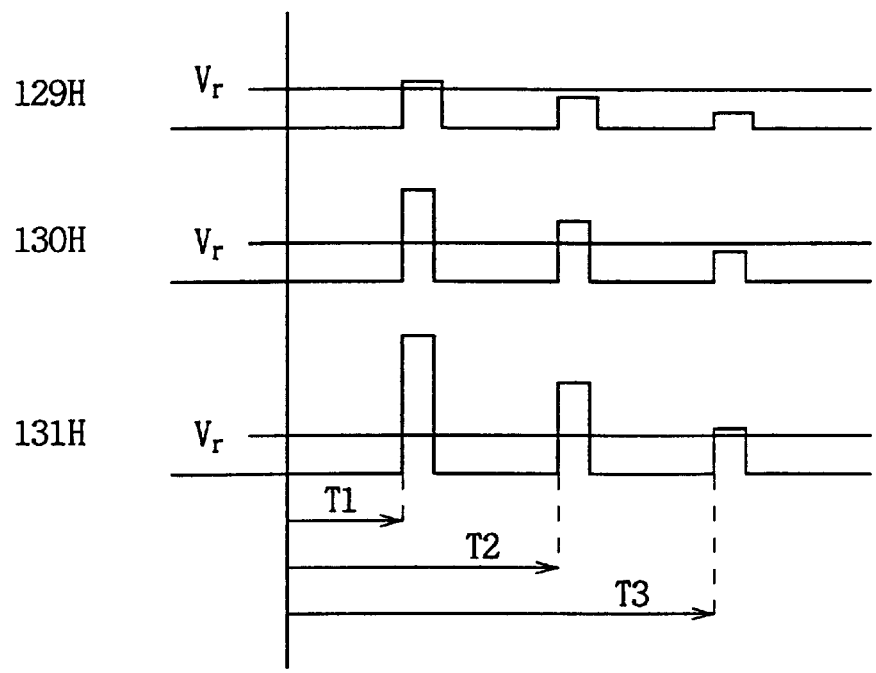
FIG. 14 is a wave-form diagram showing the relationship between the reflected-light components and the reference voltage Vr.

In fact, as shown in FIG. 14, in order to display the signal level of the reflected pulse S25 on the approximate lower-half portion of the screen (129H–256H) as a bar graph, the gain controlling amplifier 43 sets the gain to the least level during the term of 1H to 128H, and then increases the gain by one step at the next 129H firstly in accordance with the staircase voltage Vo.

In this case, only the reflected light component which has appeared $T_1$ [sec] later is larger than the reference voltage Vr, hence the comparator 49 regards only this reflected light component as high level and outputs it to the AND gate 45.

Subsequently, during the period of 130H, the staircase voltage Vo rises by one step, and the gain of the gain controlling amplifier 43 is further raised by one step. In this case, the reflected light component which has appeared $T_1$ [sec] later and the reflected light component which has appeared $T_2$ [sec] later exceed the reference voltage Vr, hence the comparator 49 regards these two reflected light components as high level and outputs a high level to the AND gate 45.

Then, during the period of 131H, the staircase voltage Vo further rises by one step, and the gain of the gain controlling amplifier 43 is further raised by one step. In this case, the reflected light component which has appeared $T_1$ [sec] later, the reflected light component which has appeared $T_2$ [sec] later, and the reflected light component which has appeared $T_3$ [sec] later exceed the reference voltage Vr, hence the comparator 49 regards all three reflected light components as high level and outputs them to the AND gate 45. In this way, the gain controlling amplifier 43 may raise the gain sequentially as the scanning line travels toward the lower portion of the screen, such that the signal levels of the reflected light components can be displayed in a form of a bar graph.

(4) Operation of the Embodiment

When the camera-CCU system 1, which is using the disconnected-portion detecting circuit 23 and 25, converts the main transmission signal S2 such as the camera picture and audio signal VA into an optical signal S3 by means of the electro-optic conversion circuit 12 and transmits the optical signal S3 through the optical fiber cable 4, the optical path of the optical signal S3 is occasionally intercepted, by any defective portion such as breaking or unsatisfactory connection of the optical fiber cable 4, and sticking of foreign substance.

In such a case, the camera-CCU system 1 starts up the disconnected-portion detecting circuit 23 by the self-diagnostic circuit 22, so as to turn to the disconnected-portion detecting mode. At this time, the disconnected-portion detect command D of "H" level is delivered to the disconnected-portion detecting circuit 23 (FIG. 4). In the disconnected-portion detecting circuit 23, the transmission pulse SP1 whose pulse width is about 0.5 [μsec] is sequentially generated for each one horizontal scanning period, on the basis of the HD which has been delayed by 12 [μsec] by the delay circuit 37. By this, the starting point of the transmission pulse SP1 can be treated as the radix point of the axis of ordinates (distance=0 [km]) of the graph which is set to the left end portion of the monitor.

The transmission pulse SP1 is converted into the driving signal S23 for emitting light during width bye period of the pulse width by means of the laser driver 32, and delivered to the laser diode 33. The laser diode 33 emits the optical signal S11 which is corresponding to the driving signal S23, and the optical signal S11 is transferred through the optical fiber cable 4.

At this time, at first, the light-power detect diode 34 directly receives the optical signal S11 which has been emitted by the laser diode 33, and, after that, it receives the feeble reflected-light component S12, which is reflected and returned based on disconnection or unsatisfactory connection of the optical fiber cable 4 or sticking of foreign substance. At this point, a time difference T occurs between the optical signal S11 and the reflected light component S12; on the axis of the abscissa which has been graduated with the length Di of the optical fiber cable 4 corresponding to the time difference T, the signal level of the reflected light component S12 is displayed in a form of a bar graph.

The optical signal S11 and the reflected-light component S12 which have been thus received are converted into the received-optical signal S13 by the light-power detect diode 34, and then it is delivered to the trans-impedance amplifier 41 of the disconnected-portion detecting circuit 23. The received optical signal S13 is amplified with the predetermined gain by the trans-impedance amplifier 41, and then delivered to the transmitting pulse extracting circuit 42 as the low-impedance electric signal S24.

The transmission pulse SP1 is eliminated from the electric signal S24 by the transmitting pulse extracting circuit 42, and only the reflected-light component is delivered to the gain controlling amplifier 43, as the amplified reflected-pulse S25.

As to the reflected pulse S25, its gain is increased with the gain controlling amplifier 43 by one step for each 1H during the period of 129H to 256H, and then it is delivered to the amplifier 48 as the reflected pulse S26.

The reflected pulse S26 is further amplified by the amplifier 48 and then delivered to the comparator 49 as the reflected pulse S27, and the amplitude level of the reflected pulse S27 is compared with the reference voltage Vr by means of the comparator 49, and delivered to one inputting-end of the AND gate 45 as the binary data S28.

When the period detection signal K1 of "H" level, which represents entering in the period of 129H to 256H, has been inputted to the other inputting-end of the AND gate 45 from the period detecting circuit 44, the binary data S28 is delivered to the ATT 50.

The signal level of the binary data S28 is lowered into about 0.7 [$V_{P-P}$] which is the same output-level as the VF image signal by the ATT 50, and then delivered to the adder 51. The axis of the abscissa, which has been graduated with the scale corresponding to the time difference T, and the axis of the ordinate which are to be displayed on the monitor are generated by the character generator 52, and then delivered to the adder 51. In this way, the adder 51 synthesizes the VF image signal, the binary data S28, the axis of the ordinate, and the axis of the abscissa, so that the disconnected-portion detecting circuit 23 is able to display the bar graph which represents the signal levels of the reflected-light components within the view finder, in such a manner that it is superimposed on the VF image signal.

In this case, the graph, which is projected within the view finder, is displayed utilizing only the period of 129H to 256H of the screen. That is, during the period of 0 to 128H only the VF image signal is projected, and, during the period of 129H to 256H the white bar-graph is displayed in such a manner that it is superimposed on the VF image signal.

In this way, the disconnected-portion detecting circuit 23 emits the optical signal Sl 1, on the basis of the transmission pulse which has been created in a synchronized manner with the HD which has been delayed by 12 [$\mu$sec] and then receives the reflected-light components S12, which are the components reflected by the defective portions exist in any portions of the optical fiber cable 4 at the time when the optical signal S11 has been transmitted through the optical fiber cable 4.

Then, the disconnected-portion detecting circuit 23 increases the gain of the reflected-light component S12 step by step with every horizontal scanning period on the basis of the HDs, and compares the reflected pulse S27 of which gain has been increased for each 1H with the reference voltage Vr, so as to obtain the binary data S28.

Subsequently, the disconnected-portion detecting circuit 23 displays the axis of the abscissa which represents the distance to the reflection position in the optical fiber cable 4 and the axis of the ordinate which represents the signal level of the reflected-light component S12 which have been generated by the character generator 52, and also displays the binary data S28, so that it is able to display the signal level of the reflected-light component S12 on the distance position representing the defective portion of the optical fiber cable 4, in a form of a bar graph.

Thus, the cameraman of the video-camera side or the staff of the sub-control room can recognize that at what position (how distant portion) of the connector 5 the signal level of the reflected-light component has became higher, by observing the graph (FIG. 3) which has been projected on the monitor. In fact, in the case where the signal level of the reflected-light component is high, it is considered that a disconnection is quite within the bounds of possibility, while the case where the signal level of the reflected-light component is extremely low may be recognized that it is due to a dust, etc. which are almost negligible.

Therefore, in the disconnected-portion detecting circuit 23, a high level which may disable transmission of the laser light and may be owing to disconnection or unsatisfactory connection is set as a threshold level, and a line X of the threshold level is marked in the graph, previously. By this, the camera-CCU system 1 is merely required to check, in the field, only a position at which the reflected-light component exceeds the line X of the threshold level. That is, a reflected-light component which do not exceed the line X of the threshold level can be thought of as owing to a negligible cause, and dispensed with checking. In addition, as shown in FIG. 3, since the signal level attenuates as the distance to the reflection position become further, it is preferable that as the distance become further the threshold value is reduced.

In this way, when such a trouble has occurred that the laser light can not be transmitted in the camera-CCU system 1 which is employing the disconnected-portion detecting circuit 23, the signal level of the reflected-light component from the disconnected portion, the portion of unsatisfactory connection, or the portion on which some foreign substance have stuck can be displayed in a form of a bar graph, within the view finder, by only turning toward the fiber disconnected-portion detecting mode, and so it is able to instantly deal with and treat the matter in the place.

According to the above constitution, in the camera-CCU system 1, the optical signal S11 which is corresponding to the transmission pulse SP1 is generated by the laser diode 33 and transmitted through the optical fiber cable 4, and then the reflected-light component S12, which has been reflected by the defective portion such as breaking of a wire, unsatisfactory connection, and sticking of foreign substance and returned entailing a time difference from the optical signal S11, is received by the disconnected-portion detecting circuit 23 as the received optical signal S13.

Then, the disconnected-portion detecting circuit 23 increases the gain of the received-optical signal S13, step by step, on the basis of the staircase voltage whose level has been raised for each horizontal scanning period, and compares it with the reference voltage Vr, so as to obtain the binary data S28. Besides, the disconnected-portion detecting circuit 23 projects the axis of the abscissa for representing the position of reflection of the optical fiber cable 4 which has been calculated on the basis of the time difference T as s distance and the axis of ordinate for representing the level of the reflected-light component S12, on the view finder, and besides displays the binary data S28.

In this way, the disconnected-portion detecting circuit 23 detects all positions which cause reflection of the optical fiber cable 4 and displays them in a form of a bar graph, so that only positions where the reflected-light components of which signal levels are so high as to exceed the threshold level line X have been detected can be recognized as the portions where problems such as disconnection and unsatisfactory connection exist. By this, with respect to the camera-CCU system 1, only positions of the optical fiber cable 4 which exceed the threshold level line X are required to be checked in the place, therefore, the problem portions can be easily detected and dealt with instantly.

(5) Other Embodiments

Figure 15:
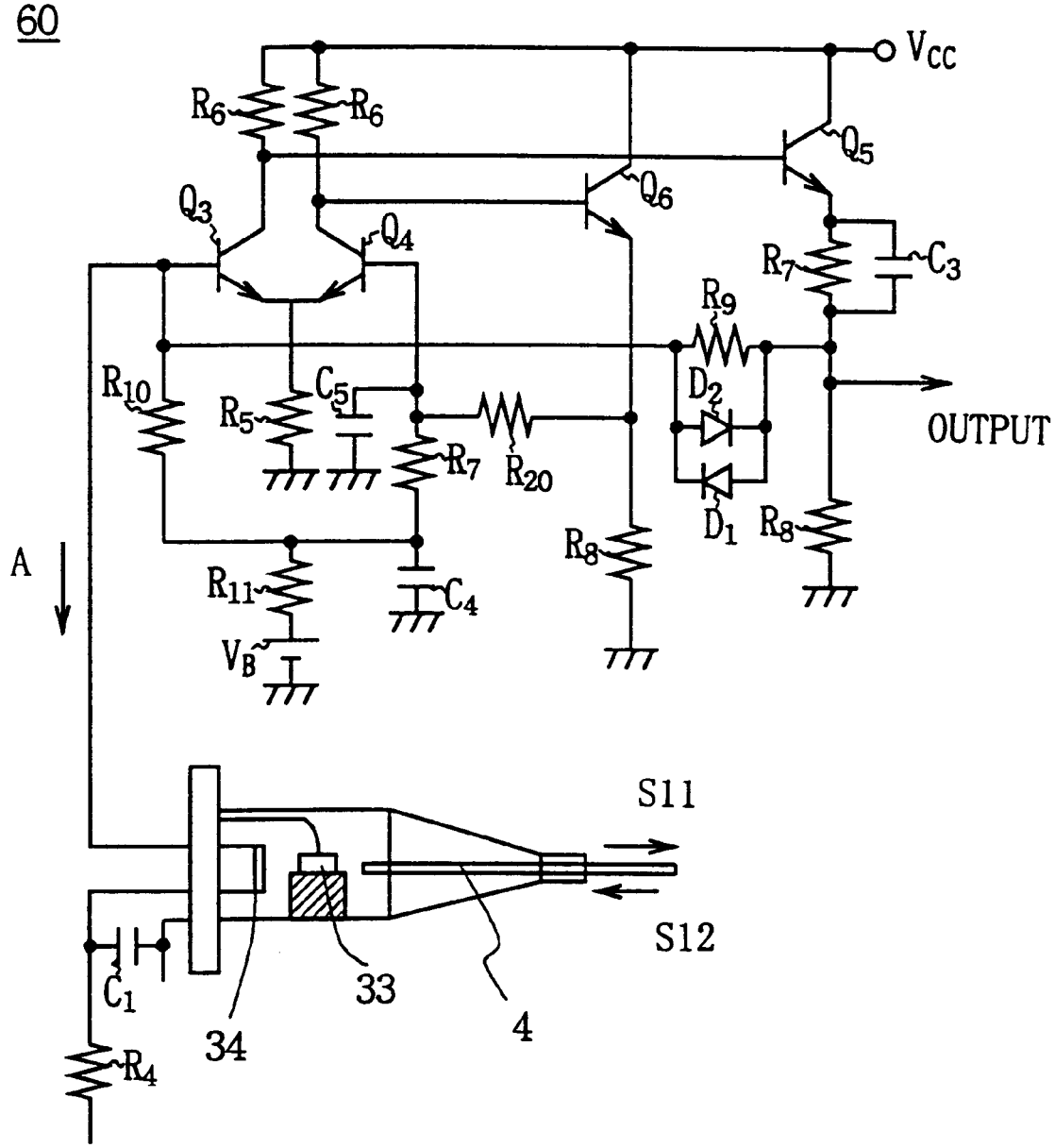
FIG. 15 is a circuit diagram showing a constitution of the trans-impedance amplifier according to the other embodiment.

In the above embodiment, the description has been given of the case where a trans-impedance amplifier 41 having a constitution shown in FIG. 8 is employed, however we do not intend to limit the present invention to this case. As the trans-impedance amplifier 60 shown in FIG. 15, an emitter-follower circuit which is comprised of a transistor $Q_6$ and a resistor $R_8$ 3may be provided and connected to the collector of the transistor $Q_4$, and negative feed-back may be performed via a feed-back resistor $R_{20}$. By this, it is able to equalize the load characteristics of the transistors $Q_3$ and $Q_4$ of the trans-impedance amplifier 60, and to improve the temperature characteristic of the amplifier itself.

Besides, in the above embodiment, the description has been given of the case where, when transmission of the various signals can not be performed, the disconnected-portion detect command D is supplied to the disconnected-portion detecting circuit 23 from the self-diagnostic circuit 22, and detection of the defective portion is commenced; however we do not intend to limit the present invention to this case. In the case where the camera-CCU system 1 is normally acting, too, the operator may stop the transmission of the various signals by turning the switch (not shown), and activate the disconnected-portion detecting circuit 23, so that detection of the defective portion is commenced.

Besides, in the above embodiment, the description has been given of the case where the staircase-voltage generating circuit 47 generates the staircase voltage Vo whose voltage value changes stepwise for each horizontal scanning period of 129H to 256H. However, this invention is not limited to this case. Alternatively, a staircase voltage comprised of steps which are corresponding to the respective two Hs, or a staircase voltage comprised of steps which are corresponding to the respective four Hs may be generated.

Figure 16:
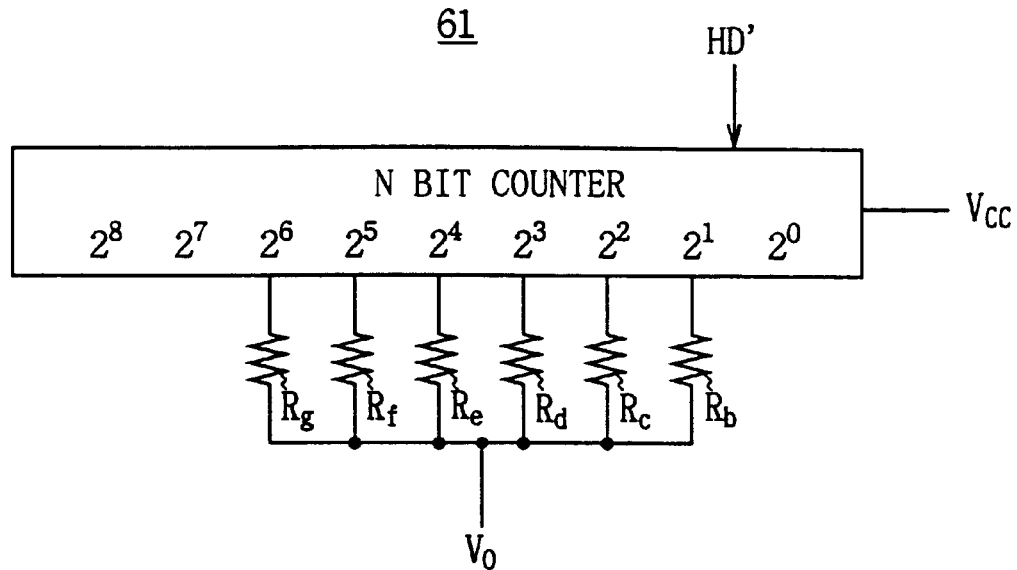
FIG. 16 is a schematic diagram showing a first constitution of the staircase-voltage generating circuit according to the other embodiment.

As shown in FIG. 16, when a staircase voltage $V_1$ which is comprised of steps, each of which is corresponding to its own two Hs, is generated in the staircase-voltage generating circuit 61, the output of $2^0$ is eliminated. In this case, with respect to the graph which represents the levels of the reflected-light components, the change of level displaying of the axis of ordinates on the screen is enlarged, and the graph becomes easy to recognize.

Figure 17:
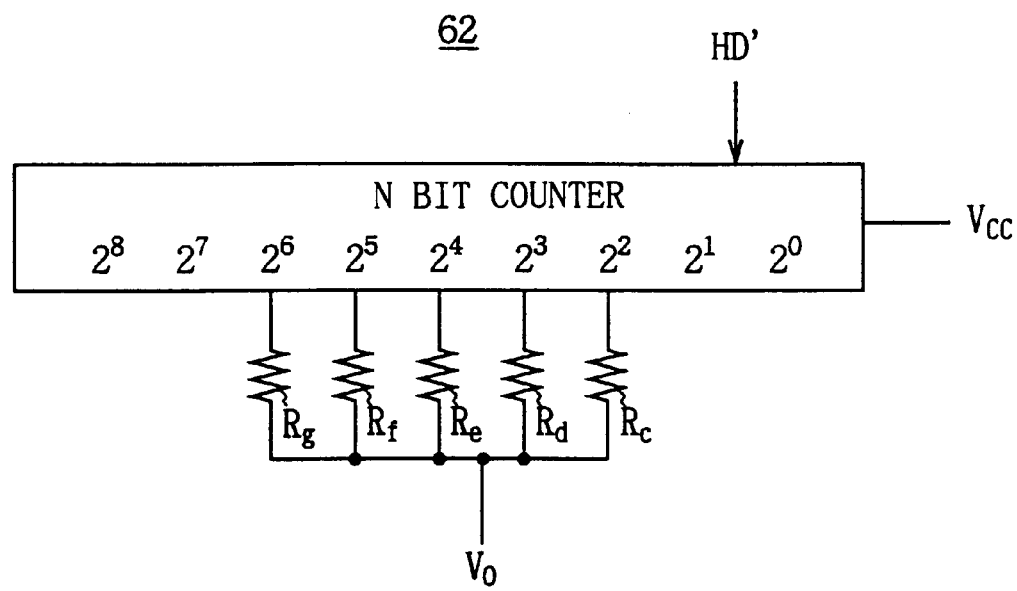
FIG. 17 is a schematic diagram showing a second constitution of the staircase-voltage generating circuit according to the other embodiment.

In addition, as shown in FIG. 17, when a staircase voltage $V_2$ which is comprised of steps, each of which is corresponding to its own four Hs, is generated in the staircase-voltage generating circuit 61, the outputs of $2^0$ and $2^1$ may be eliminated. In this case too, with respect to the graph which represents the levels of the reflected-light components, the change of level displaying of the axis of ordinates is enlarged, and so the graph becomes easy to recognize.

Besides, in the above embodiment, the description has been given of the case where the axis of ordinates of the graph which has been generated by the character generator 52 is synthesized in the adder 51. However, the present invention is not limited to this case. Since the transmission pulse SP1 is generated on the basis of the HD which is phase-adjusted to set the left end of the monitor as a starting point, the axis of ordinates may be displayed by outputting the transmission pulse SP1 simultaneously with the binary data S28. In practice, during the period when the period detection signal K1 of "H" level which shows that it is in the period of 129H to 256H is being inputted to the AND gate 45, the binary data S28 and the transmission pulse SP1 are preferably delivered to the AND gate 45 simultaneously.

Besides, in the above embodiment, the description has been given of the case where the graph which shows the signal level of the reflected-light component is displayed with an interlace mode, during the period of 129H to 256H. However the present invention is not limited to this case, but the graph may be displayed during the period of 0H to 128H which is the period corresponding to the upper half portion of the screen, or the graph may be displayed in the other various areas on the screen.

As described above, according to the present invention, the optical signal which has been generated on the basis of the transmission pulse which is outputted in synchronization with the horizontal synchronized signal is transmitted via the transmission line, and the reflected-light component which has been reflected by the defective portion of the transmission line is received, and the gain of the reflected-light component is increased step by step for every predetermined horizontal lines on the basis of the horizontal synchronized signal and then compared with the reference voltage, and hereby the binary data is obtained; the binary data is displayed, along with the axis of the abscissa which shows the distance of the transmission line corresponding to the time difference between the optical signal and the reflected-light component, and the axis of the ordinate which shows the level of the reflected-light component. By this, the level of the reflected-light component can be displayed as an analog bar graph at the position which corresponds to the distance of the transmission line where the reflected-light component has been generated, therefore, it is able to judge whether the defective portion is owing to disconnection, unsatisfactory connection, or sticking of foreign substance or not in response to the level of the reflected-light component; in this way, the defective portion detecting device can be realized wherein the problem portion can be easily confirmed in a short time.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A defective portion detecting device used in a transmission device for transmitting a laser light through a light transmission path, the detecting device comprising:

optical signal output means for outputting an optical signal on the basis of a transmission pulse signal generated in accordance with a horizontal synchronized signal;

photoelectric converting means positioned in the vicinity of said optical signal output means for photoelectric-converting the optical signal and producing a received signal;

signal level changing means for changing a signal level of said received signal, with a gain that is one of increased and decreased by predetermined levels for each predetermined number of periods of said horizontal synchronized signal and producing an output signal;

comparing means for comparing a signal level of the output signal of said signal level changing means with a threshold value and producing a compared result as a binary data signal; and display means for displaying the binary data signal of said comparing means at a timing based upon said horizontal synchronized signal by superimposing said binary data signal on graph axes composed of a first axis indicating a distance between said signal output means and a reflection position of said light transmission path and a second axis indicating the signal level of the output signal of said signal level changing means based on a time difference between a timing when the optical signal is output from said optical signal outputting means and a timing when the optical signal is received at said photoelectric converting means.

2. The defective portion detecting device according to claim 1, wherein said optical signal output means outputs said optical signal for each horizontal scanning period at a timing based upon said horizontal synchronized signal.

3. The defective portion detecting device according to claim 1, further comprising:

graph axes generating means for generating said first graph axis and said second graph axis; and combining means for combining said first graph axis and said second graph axis and the binary data signal of said comparing means.

4. The defective portion detecting device according to claim 1, wherein said signal level changing means includes means for setting said gain to a lowest gain during a predetermined number of horizontal scanning periods at a timing of the horizontal synchronized signal.

5. The defective portion detecting device according to claim 1, further comprising eliminating means operating at a timing in accordance with said transmission pulse signal for eliminating a component based on the optical signal output from said optical signal output means and directly inputted to said photoelectric converting means.

6. The defective portion detecting device according to claim 5, wherein said eliminating means eliminates said component based on a signal having a pulse width longer than a pulse width of said transmission pulse signal.

7. The defective portion detecting device according to claim 1, wherein said signal level changing means includes means for changing the signal level of said received signal with a gain that is increased by predetermined levels for each horizontal period of said horizontal synchronized signal.

8. The defective portion detecting device according to claim 1, wherein said light transmission path comprises an optical fiber cable.

* * * * *